(12) United States Patent
Miyagi et al.

(10) Patent No.: US 7,403,310 B2
(45) Date of Patent: Jul. 22, 2008

(54) IMAGE PROCESSING APPARATUS AND METHOD

(75) Inventors: Noriko Miyagi, Tokyo (JP); Satoshi Ouchi, Tokyo (JP); Koji Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 964 days.

(21) Appl. No.: 10/287,630

(22) Filed: Nov. 5, 2002

(65) Prior Publication Data

US 2003/0095287 A1    May 22, 2003

(30) Foreign Application Priority Data

Nov. 16, 2001    (JP)    ............... 2001-351216

(51) Int. Cl.
H04N 1/40    (2006.01)
(52) U.S. Cl. .............. 358/3.24; 358/3.27; 382/199; 382/269
(58) Field of Classification Search ............ 358/1.9, 358/2.1, 3.24, 3.27, 3.14–3.15; 382/199–200, 382/265–266, 269
See application file for complete search history.

(56) References Cited

U.S. PATENT DOCUMENTS

| | | | |
|---|---|---|---|
| 5,025,481 A | 6/1991 | Ohuchi | |
| 5,038,314 A * | 8/1991 | Kelleher | ............ 708/552 |
| 5,134,666 A | 7/1992 | Imao et al. | |
| 5,148,495 A | 9/1992 | Imao et al. | |
| 5,311,332 A | 5/1994 | Imao et al. | |
| 5,418,899 A | 5/1995 | Aoki et al. | |
| 5,436,739 A | 7/1995 | Imao et al. | |
| 5,541,742 A | 7/1996 | Imao et al. | |
| 5,604,821 A * | 2/1997 | Ranganathan et al. | ....... 382/236 |
| 5,617,485 A | 4/1997 | Ohuchi et al. | |
| 5,629,752 A * | 5/1997 | Kinjo | ............ 355/35 |
| 5,659,406 A | 8/1997 | Imao et al. | |
| 5,825,937 A | 10/1998 | Ohuchi et al. | |
| 5,850,298 A | 12/1998 | Narahara et al. | |
| 5,911,004 A | 6/1999 | Ohuchi et al. | |
| 6,259,813 B1 | 7/2001 | Ouchi | |
| 6,333,793 B1 | 12/2001 | Kobayashi | |
| 6,480,623 B1 | 11/2002 | Yagishita et al. | |
| RE37,940 E | 12/2002 | Imao et al. | |
| 7,102,791 B2 | 9/2006 | Hirano et al. | |

FOREIGN PATENT DOCUMENTS

| | | |
|---|---|---|
| JP | 62 166471 A | 7/1987 |
| JP | 62166471 A * | 7/1987 |
| JP | 3-16758 | 1/1991 |
| JP | 09-186866 | 7/1997 |
| JP | 10-173916 | 6/1998 |
| JP | 2000-206756 | 7/2000 |

* cited by examiner

*Primary Examiner*—Thomas D. Lee
*Assistant Examiner*—Stephen Brinich
(74) *Attorney, Agent, or Firm*—Dickstein Shapiro LLP

(57) ABSTRACT

An edge amount detector detects an edge amount from RGB signals, and a filter processor synthesizes an output for edge enhancement with an output for smoothing at a proportion based on the detected edge amount. Another edge amount detector detects an edge amount of a black component from CMY signals, and an ink generator/undercolor remover changes an ink generation rate according to the detected edge amount.

10 Claims, 14 Drawing Sheets

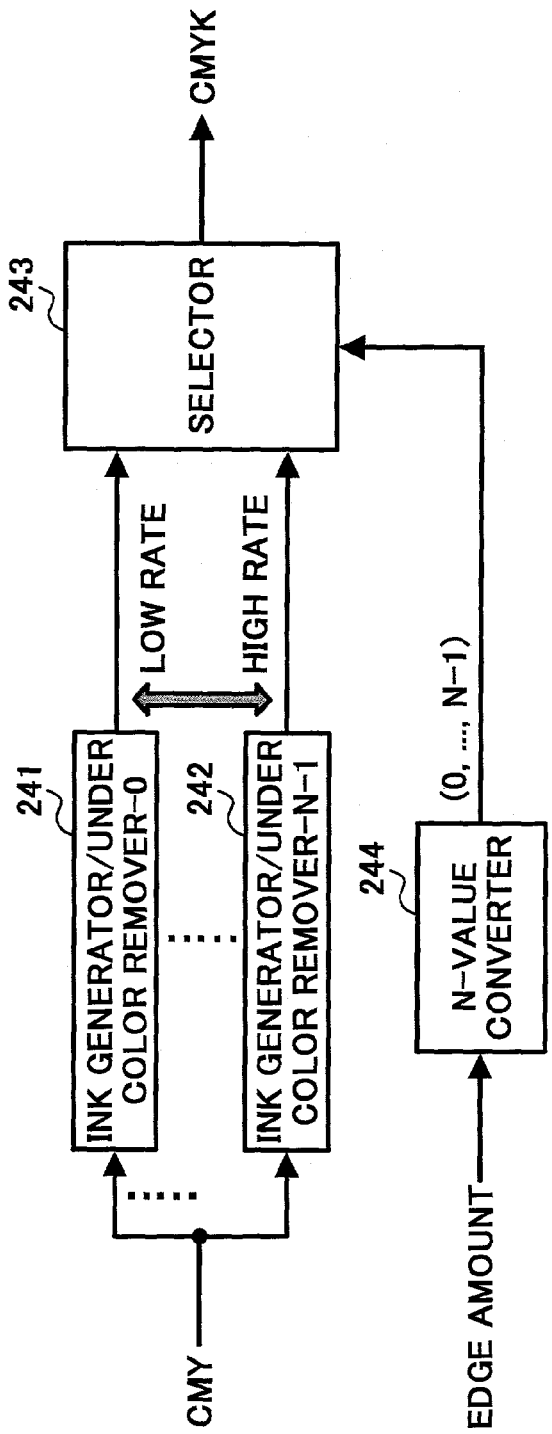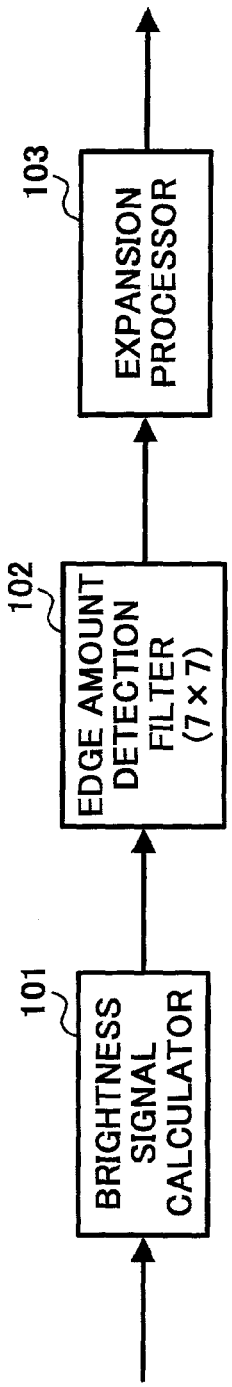

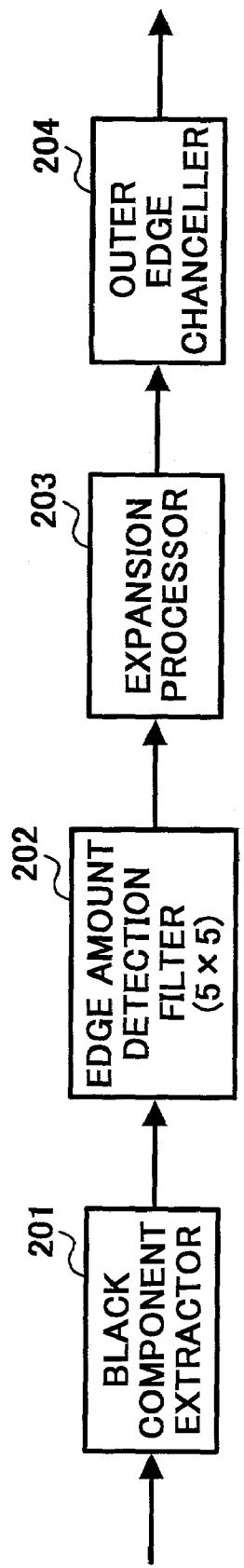

FIG. 9A

| -1 | -1 | -1 | 0 | 1 | 1 | 1 |
|----|----|----|---|---|---|---|
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |

FIG. 9B

| -1 | -1 | -1 | -1 | -1 | -1 | -1 |
|----|----|----|----|----|----|----|
| -1 | -1 | -1 | -1 | -1 | -1 | -1 |
| -1 | -1 | -1 | -1 | -1 | -1 | -1 |
| 0 | 0 | 0 | 0 | 0 | 0 | 0 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

FIG. 9C

| 0 | 1 | 1 | 1 | 1 | 1 | 1 |
|---|---|---|---|---|---|---|
| -1 | 0 | 1 | 1 | 1 | 1 | 1 |
| -1 | -1 | 0 | 1 | 1 | 1 | 1 |
| -1 | -1 | 0 | 0 | 1 | 1 | 1 |
| -1 | -1 | -1 | -1 | 0 | 1 | 1 |
| -1 | -1 | -1 | -1 | -1 | 0 | 1 |
| -1 | -1 | -1 | -1 | -1 | -1 | 0 |

FIG. 9D

| 1 | 1 | 1 | 1 | 1 | 1 | 0 |
|---|---|---|---|---|---|---|
| 1 | 1 | 1 | 1 | 1 | 0 | -1 |
| 1 | 1 | 1 | 1 | 0 | -1 | -1 |
| 1 | 1 | 1 | 0 | -1 | -1 | -1 |
| 1 | 1 | 0 | -1 | -1 | -1 | -1 |
| 1 | 0 | -1 | -1 | -1 | -1 | -1 |
| 0 | -1 | -1 | -1 | -1 | -1 | -1 |

FIG. 10A

|  |  |  |  |  |
|---|---|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG. 10B

|  |  |  |  |  |
|---|---|---|---|---|
| -1 | -1 | -1 | -1 | -1 |
| -1 | -1 | -1 | -1 | -1 |
| 0 | 0 | 0 | 0 | 0 |
| 1 | 1 | 1 | 1 | 1 |
| 1 | 1 | 1 | 1 | 1 |

FIG. 10C

|  |  |  |  |  |
|---|---|---|---|---|
| 0 | 1 | 1 | 1 | 1 |
| -1 | 0 | 1 | 1 | 1 |
| -1 | 0 | 0 | 1 | 1 |
| -1 | -1 | -1 | 0 | 1 |
| -1 | -1 | -1 | -1 | 0 |

FIG. 10D

|  |  |  |  |  |
|---|---|---|---|---|
| 1 | 1 | 1 | 1 | 0 |
| 1 | 1 | 1 | 0 | -1 |
| 1 | 1 | 0 | -1 | -1 |
| 1 | 0 | -1 | -1 | -1 |
| 0 | -1 | -1 | -1 | -1 |

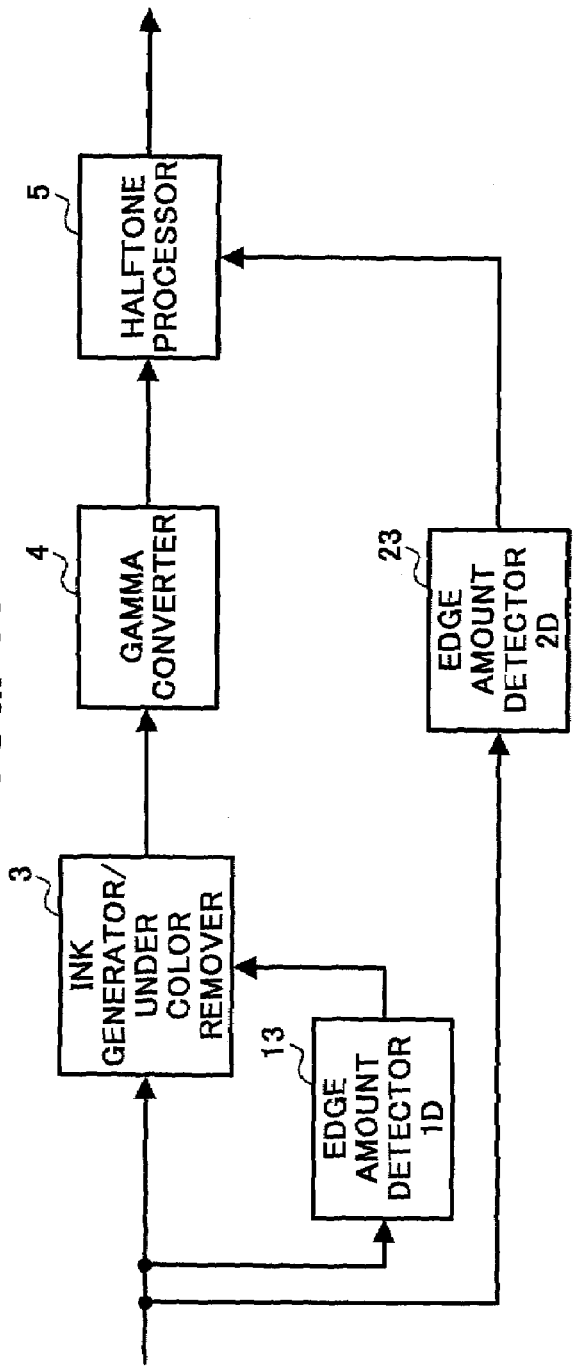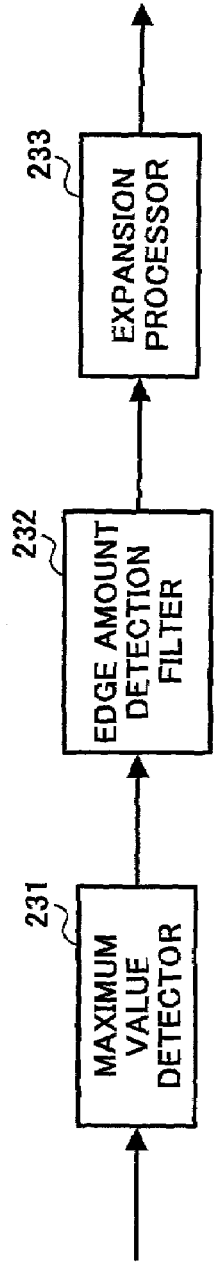

IMAGE PROCESSING APPARATUS AND METHOD

BACKGROUND OF THE INVENTION

1) Field of the Invention

The present invention relates to an image processing apparatus and method of obtaining a high quality reproduced image for a character edge portion. More particularly, this invention relates to an image processing apparatus and method of performing a plurality of adaptive processings based on an edge amount, and being a technique suited for copiers, printers, facsimiles, or the like.

2) Description of the Related Art

There has been a conventional art such that the edge amount of an edge portion in an image input through a scanner or the like is detected to control each image processing according to the edge amount. This is intended to provide an image in which a picture pattern portion is kept smooth by putting emphasis on gradation of this portion while a character edge portion is thin and clear by putting emphasis on sharpness of this portion. Accordingly, various processings related to the sharpness of character edge are considered as controlling of each character edge portion according to the edge amount. The processings of a color image processing apparatus shown in FIG. 1 includes a filtering (edge enhancement and smoothing), an ink generation/undercolor removal processing, a gamma conversion processing, and a halftoning. If a monochrome image is to be processed, all processings but the ink generation/undercolor removal processing are performed. Further, an apparatus that controls a plurality of adaptive processings according to one edge amount or a corrected edge amount obtained by being corrected according to the control target processing has been proposed in recent years.

An apparatus described, for example, in Japanese Patent Application Laid-Open No. 2000-206756 performs adaptive processings on an edge enhancement processing and an ink generation/undercolor removal processing. An edge region is detected from a signal not subjected to an edge enhancement processing, a detected edge amount (Laplacian quantity) is converted using look-up tables (LUT) and the resultant quantity is added to a source signal, thereby realizing edge enhancement. The ink generation/undercolor removal processing is performed after the edge enhancement. In the ink generation/undercolor removal processing, the edge region detected from the signal before being subjected to edge enhancement is enlarged and the densities of respective color components in the enlarged edge region are changed. Further, the adaptive processing for the ink generation/undercolor removal processing has functions of generating an edge amount so that the portions that are enlarged outwardly (those on a background) are canceled and only the portions enlarged inwardly (those on characters) are left, and of changing the densities based on this signal. If a high rate ink generation/high rate undercolor removal processing is conducted to the outer edge which corresponds to a color base background portion of a character on a color base similarly to the character portions, a color difference tends to occur between the outer edge and the color base background portion outside of the outer edge, which is not preferable.

In the image processings shown in FIG. 1, there are processings, other than the halftoning, which inevitably or slightly intentionally control the line width of character portions on image data. These are the filtering and the gamma conversion processing. In the edge enhancement processing in the filtering, line width tends to be larger if a spatial filter that emphasizes low frequency components is used, and tends to be smaller if a spatial filter that emphasizes high frequency components is used.

Generally, it is considered that a "thin yet clear" character edge portion is preferable. However, this does not apply to a low contrast character that is low in density. The emphasis on high frequency components is not necessarily good. It is most important for the low contrast character to be visible and to be readable. In other words, it may be preferable to make the low contrast character thick.

Similar line width control can be conducted by gamma conversion. An example of controlling line width by gamma conversion is shown in FIG. 2. Gamma conversion 1 is conducted in a direction in which the line width is increased, and, in contrast, gamma conversion 2 is conducted in a direction in which the line width is decreased.

As can be seen, although the line width may possibly be changed before and after the filtering or the gamma conversion, the apparatus described in the publication controls the ink generation/undercolor removal processing as a processing conducted to a signal after being subjected to the filtering, using the edge region signal obtained from the signal before being subjected to the filtering as explained above. To be precise, the edge positions do not sometime coincide with each other.

Likewise, an apparatus described in Japanese Patent Application Laid-Open No. H10-173916 performs processings for controlling gamma conversion and halftoning in accordance with one edge amount. The edge amount is generated from a signal before being subjected to the gamma conversion and the filtering that is prior to the gamma conversion. Actually, the line width is increased or decreased by the filtering or the gamma conversion by as small as about one dot and the increase or decrease thereof is not so explicit. However, an apparatus that has a mechanism to cancel outer edges as the apparatus described in Japanese Patent Application Laid-Open No. 2000-206756, requires high positional accuracy, and the increase or decrease of the line width is greatly influential. The significance of the positional accuracy can be easily estimated from a color deviation of each of cyan, magenta, yellow, black (CMYK) plates when a result of image processing is output from any output device such as a printer.

Further, as described in Japanese Patent Application Laid-Open No. H3-16758, there is another apparatus that explicitly controls line width through processing. If a certain adaptive processing based on an edge amount is carried out after line width is processed, by obtaining the edge amount from a signal before being subjected to the line width processing, an edge position may be displaced in the unit of several dots. In this case, adaptive processings in a downstream stage cannot exhibit effects as desired.

SUMMARY OF THE INVENTION

It is an object of this invention to provide an image processing apparatus and method capable of sufficiently exhibiting the effects of respective adaptive processings by calculating an optimum edge amount for each adaptive processing when a plurality of adaptive processings are to be conducted based on the edge amount.

The image processing apparatus according to one aspect of this invention comprises a plurality of adaptive processors each of which performs a predetermined adaptive processing in accordance with an edge amount of an image signal, and an edge amount detector that detects the edge amount for each of the adaptive processors.

The image processing method according to another aspect of this invention comprises steps of performing a plurality of predetermined adaptive processings in accordance with an edge amount of an image signal, and detecting the edge amount in each of the adaptive processing steps.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 shows the configuration of an ink generator/undercolor remover based on the edge amount, FIG. 6 shows the configuration of an edge amount detector for filtering, FIG. 7 is shows the configuration of an edge amount detector for the ink generator/undercolor remover, FIG. 9A to FIG. 9D show four types of 7×7 filters employed in the edge amount detector for filtering, FIG. 10A to FIG. 10D show four types of 5×5 filters employed in the edge amount detector for the ink generator/undercolor remover, FIG. 17 shows the configuration of a fourth embodiment of the present invention, and FIG. 18 shows the configuration of an edge amount detector for the halftone processor.

DETAILED DESCRIPTIONS

Embodiments of the present invention will be concretely explained with reference to the drawings.

Figure 1:
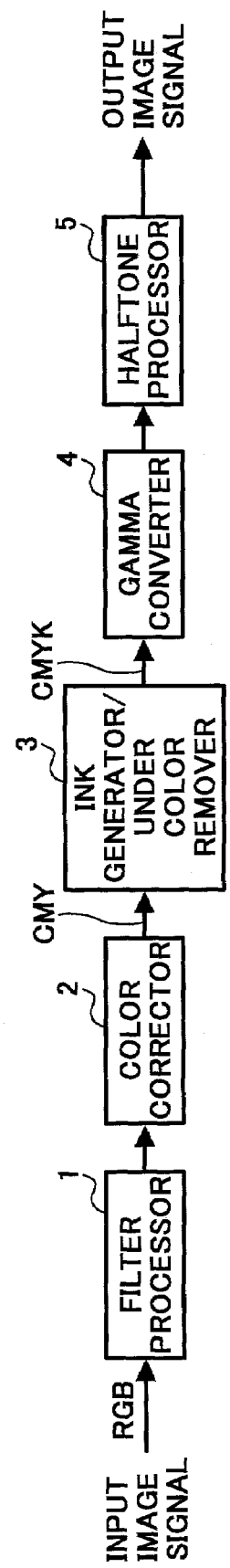
FIG. 1 shows the configuration of an image processing apparatus to which the present invention is applied.
Figure 2:
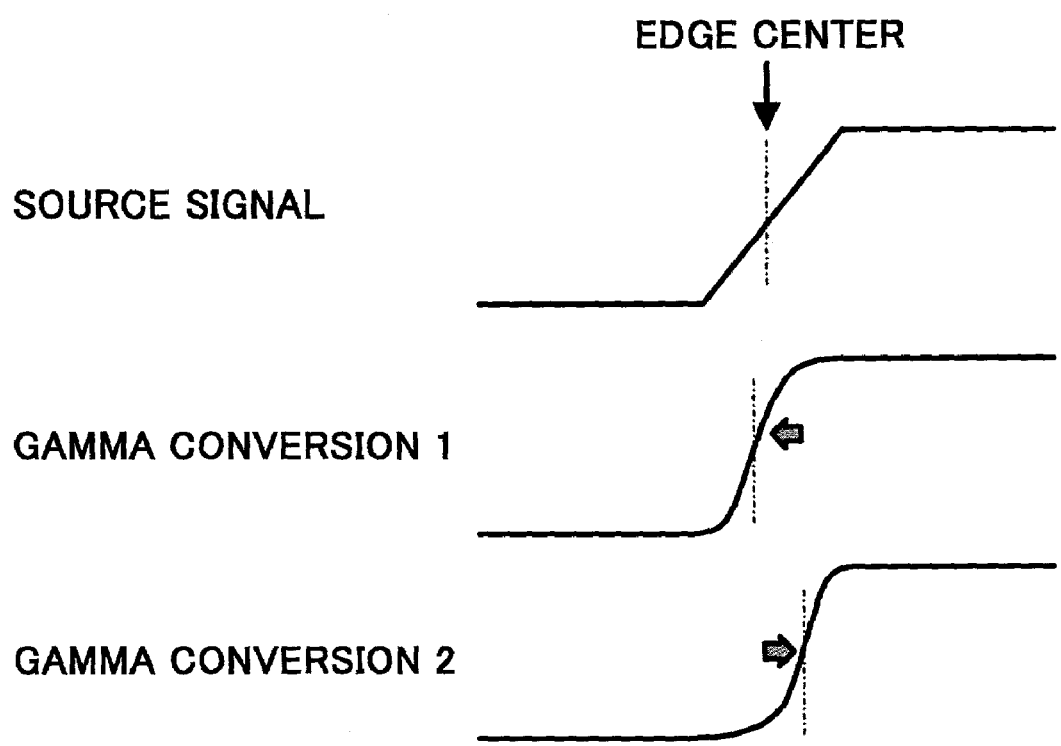
FIG. 2 is a diagram for explaining an example of line width control using gamma conversion.

A first embodiment of the present invention will be explained below. FIG. 1 shows the configuration of an image processing apparatus to which this invention is applied. Red, green, blue (RGB) signals of an input image are obtained first through an interface such as a color scanner or a network.

A filter processor 1 performs edge enhancement filtering and filtering for smoothing. FIG. 4 shows the configuration of the filter processor 1. A synthesizer 43 synthesizes the results of the filtering in both an edge enhancement filter 41 and a smoothing filter 42 with each other at a proportion based on an edge amount detected by an edge amount detector (1A) 10 shown in FIG. 3. That is, if the edge amount is large, the synthetic processing is carried out so that the output result of the edge enhancement filter 41 is higher in proportion. If the edge amount is small, the synthetic processing is carried out so that the output result of the smoothing filter 42 is higher in proportion.

A color corrector 2 converts the RGB signals to CMY (or CMYK depending on cases) signals by performing a masking operation or a memory interpolation processing by a three-dimensional LUT. The masking operation will now be explained.

A conversion equation is expressed by equation 1 using color correction parameters a0 to a3, b0 to b3, and c0 to c3 (masking coefficients) as follows, $$C = a0 + a1 \times R' + a2 \times G' + a3 \times B'$$

$$M = b0 + b1 \times R' + b2 \times G' + b3 \times B'$$

$$Y = c0 + c1 \times R' + c2 \times G' + c3 \times B' \quad (1)$$

An ink generator/undercolor remover 3 subtracts components corresponding to ink amounts from the CMY signals (undercolor removal) and generates a K signal (ink generation). In the ink generation, K is given by multiplying Min(C, M, Y) by an appropriate multiplication function f not more than 1 (equation 2).

$$K = \text{Min}(C, M, Y) \times f \quad (2)$$

At f=1, ink becomes full black.

In the undercolor removal, using the CMY signals and the K signal generated according to the equation 2, the following equation is given, $$C' = C - K$$

$$M' = M - K$$

$$Y' = Y - K \quad (3)$$

Figure 3:
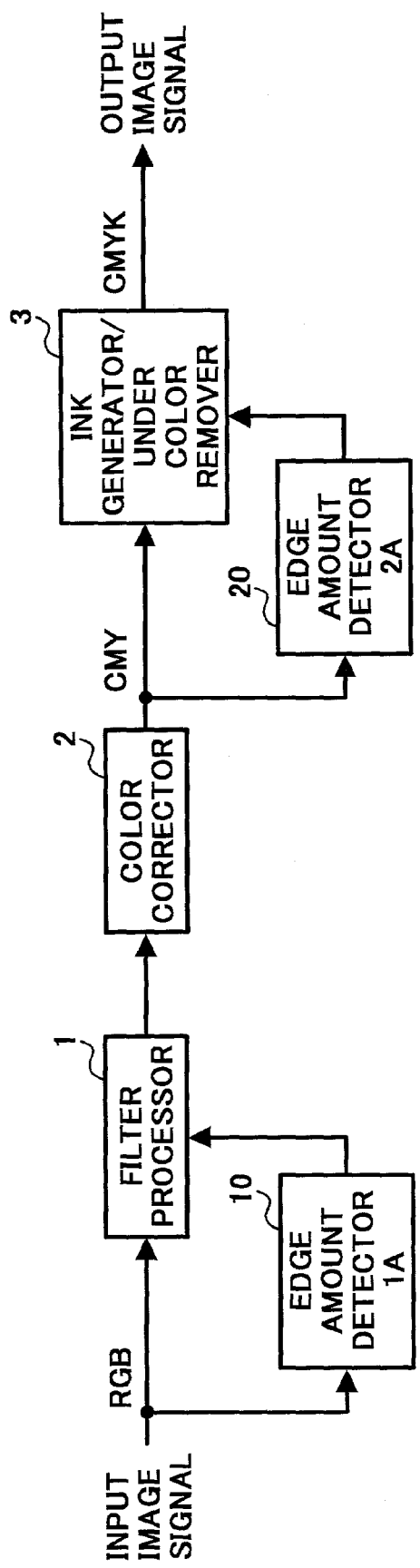
FIG. 3 shows the configuration of a first embodiment of the present invention.
Figure 4:
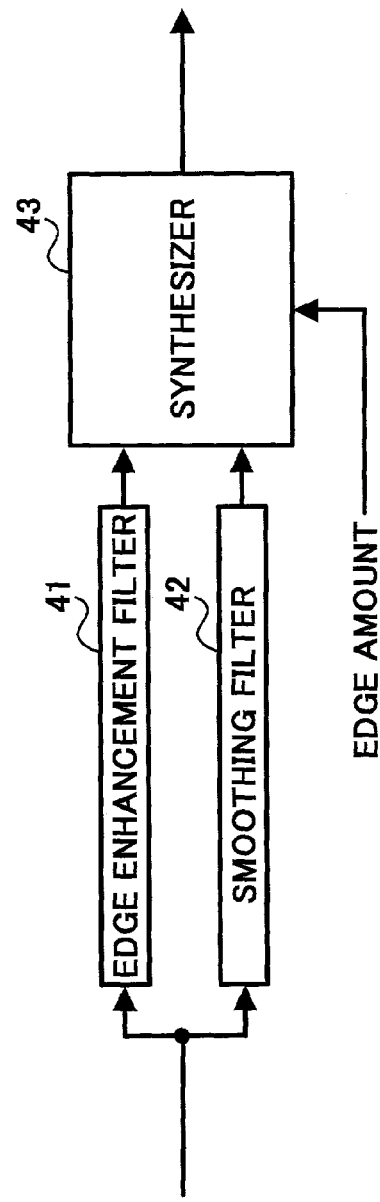
FIG. 4 shows the configuration of a filter processor based on an edge amount.

At this time, the multiplication parameter f is controlled based on the edge amount detected by an edge amount detector (2A) 20 shown in FIG. 3. FIG. 5 shows the configuration of the ink generator/undercolor remover 3 controlled based on the edge amount. In FIG. 5, N stages of coefficients f (241, 242) for undercolor removal (UCR)/ink generation are prepared and the coefficients f are changed according to the edge amount by a selector 243. If the edge amount is the maximum (when a value obtained by converting the edge amount to an N value by an N-value converter 244 is N−1), the selector selects f (242) with which an ink rate becomes 100% (full black) at f=1. If the edge amount is 0, the selector selects f (241) with which the ink rate is 50% at f=0.5. If the edge amount is between N−1 and 0, the ink rate changes between f=1 and f=0.5. The coefficient representing the ink rate is changed in this embodiment. However, (N−1) tables having different ink rates may be prepared so as to perform the ink generation/undercolor removal processing by changing the tables.

FIG. 6 shows the configuration of an edge amount detector (1A) 10 that detects an edge amount for the filtering. A brightness signal calculator 101 calculates a brightness signal from the RGB signals. As the brightness signal, for example, the Y signal of YIQ signals may be used.

$$Y = 0.30 \times R + 0.59 \times G + 0.11 \times B \quad (4)$$

The brightness signal may be a signal defined by synthesizing the RGB signals (or synthesizing two signals out of them) at a different proportion from that shown in the equation 4 or may be a lightness signal. Alternatively, only the G signal may be selected from among the RGB signals and supplied to a later stage, considering a hardware configuration.

Figure 8:
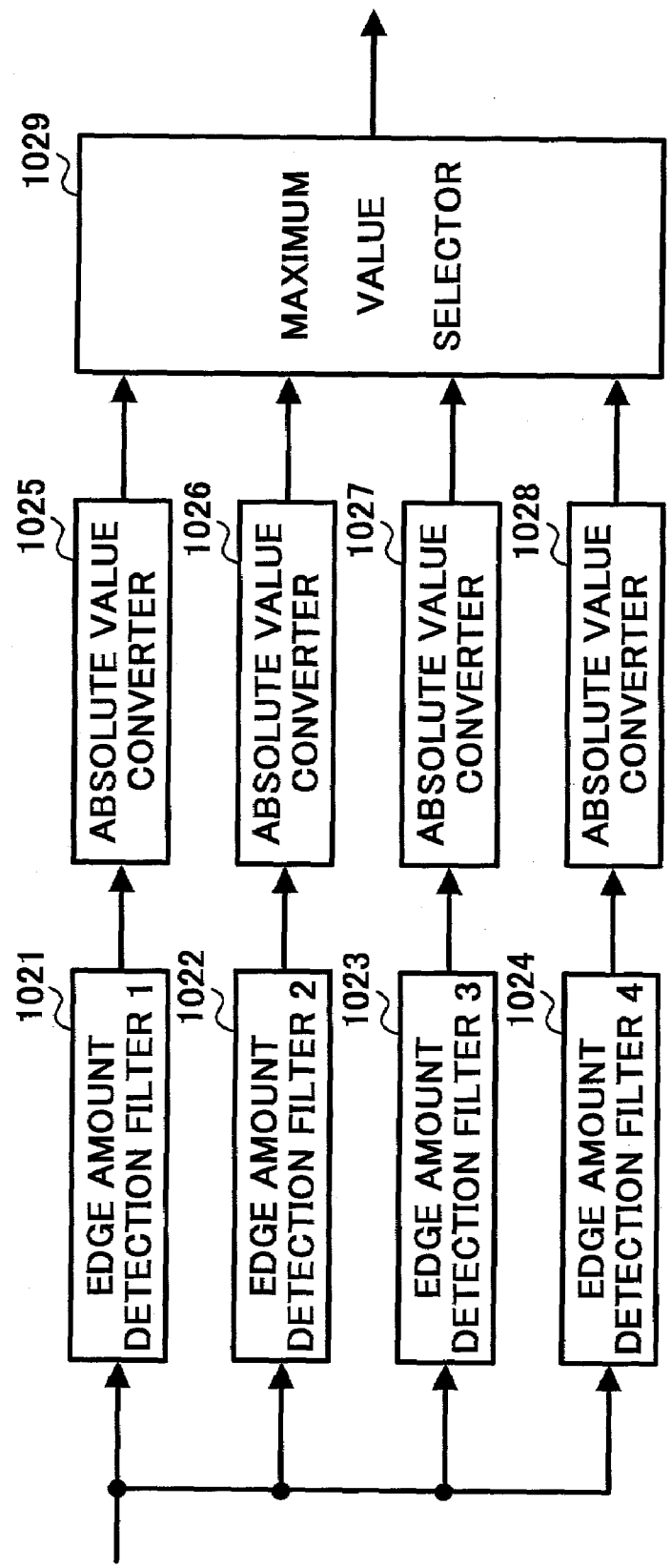
FIG. 8 is shows the configuration of an edge amount detection filter.

FIG. 8 shows the configuration of the edge amount detection filter 102. An edge amount detection filter (1) 1021, an edge amount detection filter (2) 1022, an edge amount detection filter (3) 1023, and an edge amount detection filter (4) 1024 perform masking processings using four types of 7×7 filters shown in, for example, FIG. 9A to FIG. 9D, respectively. A maximum value selector 1029 selects one of the outputs of the four filters having the highest absolute value obtained by one of absolute value converters 1025 to 1028. Finally, an expansion processor 103 is performed. The expansion processing is performed by referring to output signals from the 3×3 edge amount detection filters around a noted pixel to replace the noted pixel with the maximum value among the output signals as a detection result of the noted pixel.

FIG. 7 shows the configuration of the edge amount detector (2A) 20 that detects an edge amount for the ink generation/undercolor removal processing. A black component extractor 201 extracts a black component. The black component may be obtained by Min (C, M, Y). The edge amount for filtering and the color attribute of signals differ from the edge amount for the ink generation/undercolor removal processing for the following reason. With regard to the edge amount for the filtering, the filtering is targeted at all character edges irrespective of the characters in black and colors. In contrast, with regard to the edge amount for the ink generation/undercolor removal processing, the processing may be targeted only at edges of black characters. However, even if a high rate ink generation and undercolor removal processing are conducted to a color character edge, no problem occurs if the black component does not increase in the processings in the previous stage. In this case, for example, the M signal can be selected in view of hardware volume to be applied to an edge amount detection filter 202 provided in the next stage.

The edge amount detection filter 202 detects an edge amount from spatial filters similarly to the edge amount for filtering. It is noted, however, the signal has a picture pattern portion that is smoothed during the filtering 1, so that the edge amount is larger in a dot picture pattern portion and the probability of response is relatively low. Therefore, filters with small filter sizes such as a 5×5 sized filter as shown in FIG. 10A to FIG. 10D are employed. An expansion processor 203 performs expansion processing similarly to the expansion processor 103 shown in FIG. 6, and performs the expansion processing by making the expansion larger than that shown in FIG. 6 while referring to, for example, 9×9 pixels. This is because the ink generation/undercolor removal processing is intended to output a signal of color close to a single black color over a relatively wide range in the interior of a black character in consideration of the possible color deviation of CMYK plates which may occur when the signal is output from an output device such as a printer. Further, an outer edge canceller 204 invalidates outer edge portions of the signal after being subjected to the expansion processing, and leaves only the expanded inner edge portions as an edge amount. Outer edge canceling is executed in the same method as that explained in Japanese Patent Application Laid-Open No. 2000-206756. With regard to the edge amount for the ink generation/undercolor removal processing, signals of smaller bits than the edge amount for the filtering may be enough. This is because the number of stages of switching the processing of a control target for the ink generation/undercolor removal processing is generally smaller than that for the filtering. Units are provided in the previous stage of the edge amount detectors (1A) 10 and (2A) 20 to first eliminate the lower bits of the signal and decrease the number of bits when the signal is input to each of the detectors (1A) 10 and (2A) 20, and each decreased amount of bits is controlled so that the amount input into the detector (2A) 20 is greater than the amount input into the detector (1A) 10. The appropriate decrease of the number of bits on the input signal side is preferable because it can decrease the number of hardware components of the edge amount detector. Needless to say, in the processing for converting the edge amount to an N value by the converter 244 shown in FIG. 5, the number of bits may be adjusted.

According to this embodiment, adaptive processings in a downstream stage can be performed while taking into account the influence of the filtering on line width, and it is possible to exhibit respective effects of a plurality of adaptive processings as desired. In addition, in detecting edge amounts, the respective processors can detect optimum edge amounts with high accuracy since it is possible to utilize optimum input signal, filter size for edge amount detection, expansion amount, and number of bits, respectively.

A second embodiment of this invention will be explained below. Although the first embodiment shows examples of adaptive processings before and after filtering and of the filtering itself, this embodiment shows examples of adaptive processings before and after gamma processing and of the gamma processing itself.

Figure 11:
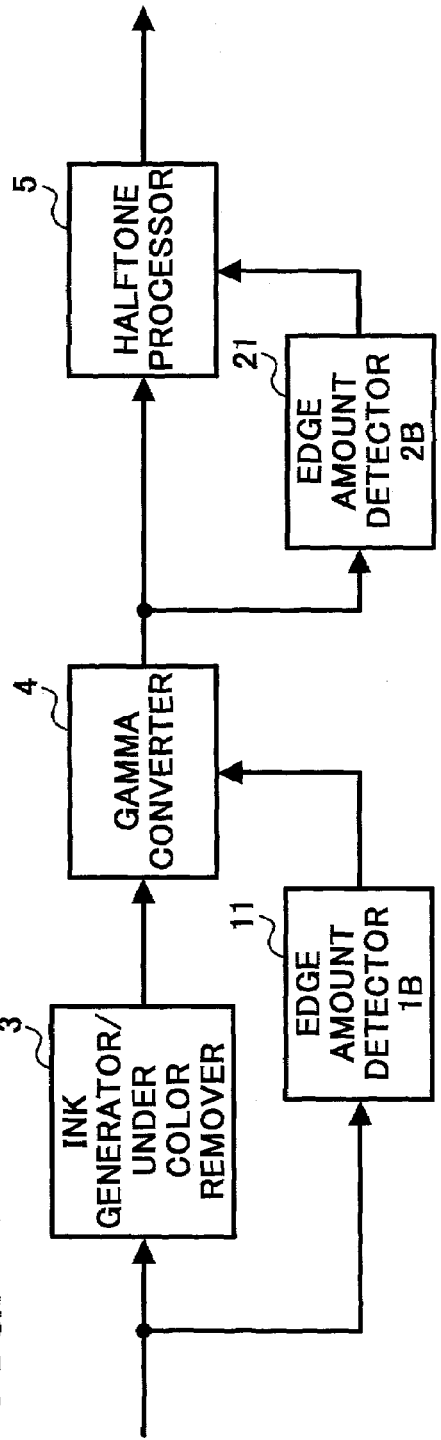
FIG. 11 shows the configuration of a second embodiment of the present invention.

As already explained in "Prior Art" part, the gamma processing also influences line width. Therefore, as shown in, for example, FIG. 11, a gamma converter 4 and a halftone processor 5 are connected in series, and the two edge amount detectors 11 and 21 are provided to detect respective edge amount using signals before and after gamma conversion when the converter 4 and the processor 5 perform adaptive processings based on the edge amounts. The edge amount detector (1B) 11 for the gamma conversion detects an edge amount similarly to FIG. 18 (an edge amount detector for halftoning in the fourth embodiment to be explained later). For the gamma conversion, it is desirable that an input signal enables detecting not only black characters but also color characters such as Max(C, M, Y). In addition, similarly to the first embodiment, the circuits shown in FIG. 8 are employed in an edge amount detection filter 232 shown in FIG. 18, and the spatial filters shown in FIG. 10 are employed for the signal after being subjected to the filtering.

The edge amount detector (2B) 21 for the halftoning may employ a signal represented by one signal or a synthesized signal as an input signal similarly to the other edge amount detector. In this embodiment, the detector detects an edge amount for each plate. An edge amount for a C plate is controlled by an edge amount that is detected by inputting a C signal. An edge amount for an M plate is controlled by an edge amount that is detected by inputting an M signal. An edge amount for a Y plate is controlled by an edge amount that is detected by inputting a Y signal. By doing so, larger edge amounts are sporadically detected, locations where small and large edge amounts are mixed are differently dispersed, according to plates, in dot portions with a fewer lines that may possibly adversely influence granularity and moirés. Therefore, it is expected to make switching portions inconspicuous. To detect edge amounts, edge amount detection filters (e.g., the filters shown in FIGS. 8 and 10) are employed similarly to the others and an expansion processing is performed if necessary.

Figure 12:
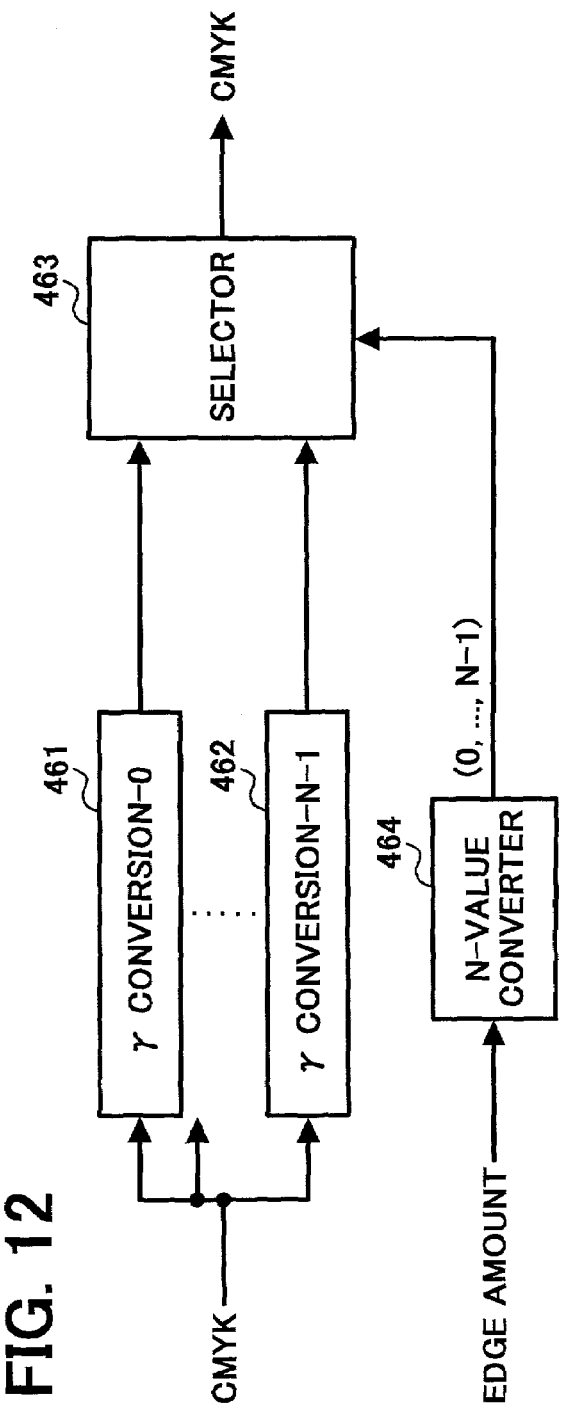
FIG. 12 shows the configuration of a gamma converter based on an edge amount.
Figure 13:
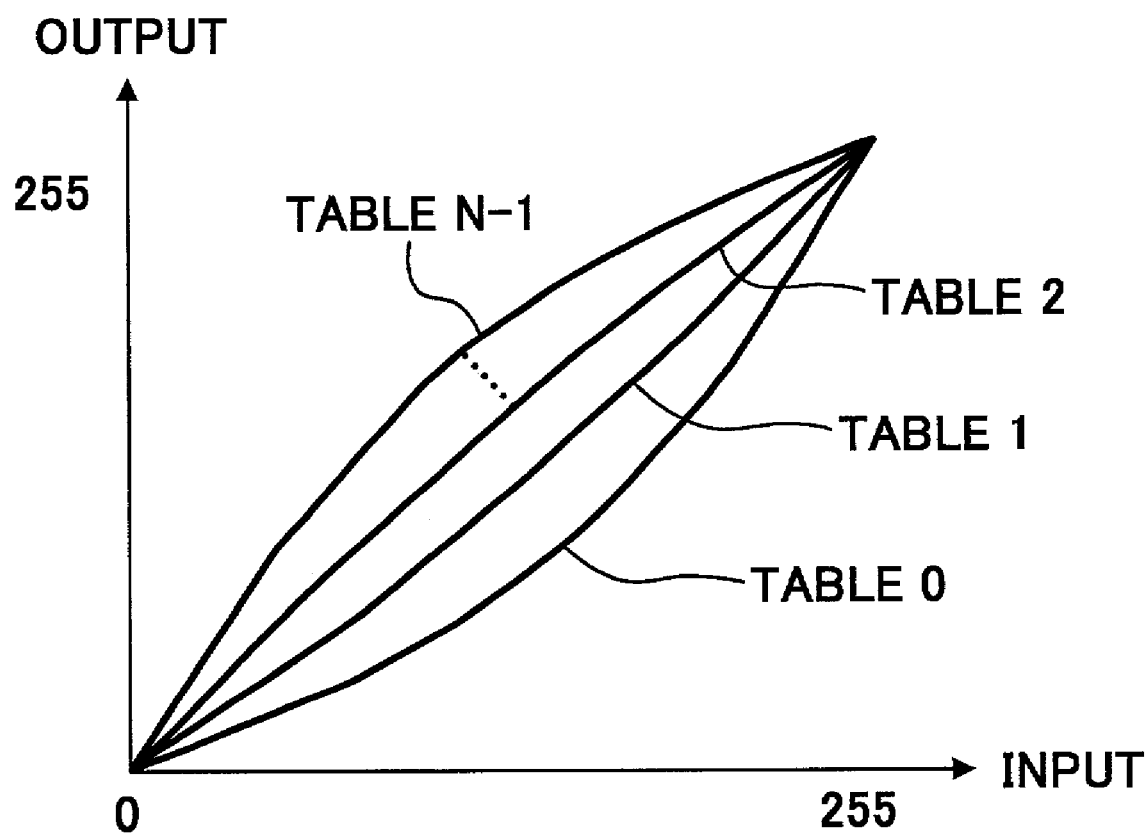
FIG. 13 shows an example of gamma conversion tables.

FIG. 12 shows the configuration of the gamma converter 4 that performs gamma conversion based on an edge amount. A sharp γ curve (a table N−1 shown in FIG. 13) is preferable for γ-correction for a character image since resolution is thought more significant than gradation. Conversely, a γ curve smoother than the character image (a table 0 shown in FIG. 13) is preferable for γ-correction for a gradation image since gradation is thought more significant. Therefore, a plurality of γ-correction tables of different levels are prepared and a selector 463 selects one table 461 or 462 from among the tables, for an intermediate region between these two curves, according to an edge amount (edge amounts 0 to N−1 by converting the edge amount to N value by an N-value converter 464). While the γ tables shown in FIG. 13 have simple forms such as a downward convex form or an upward convex form, other tables having forms such as an S-shaped table may be employed.

Figure 14:
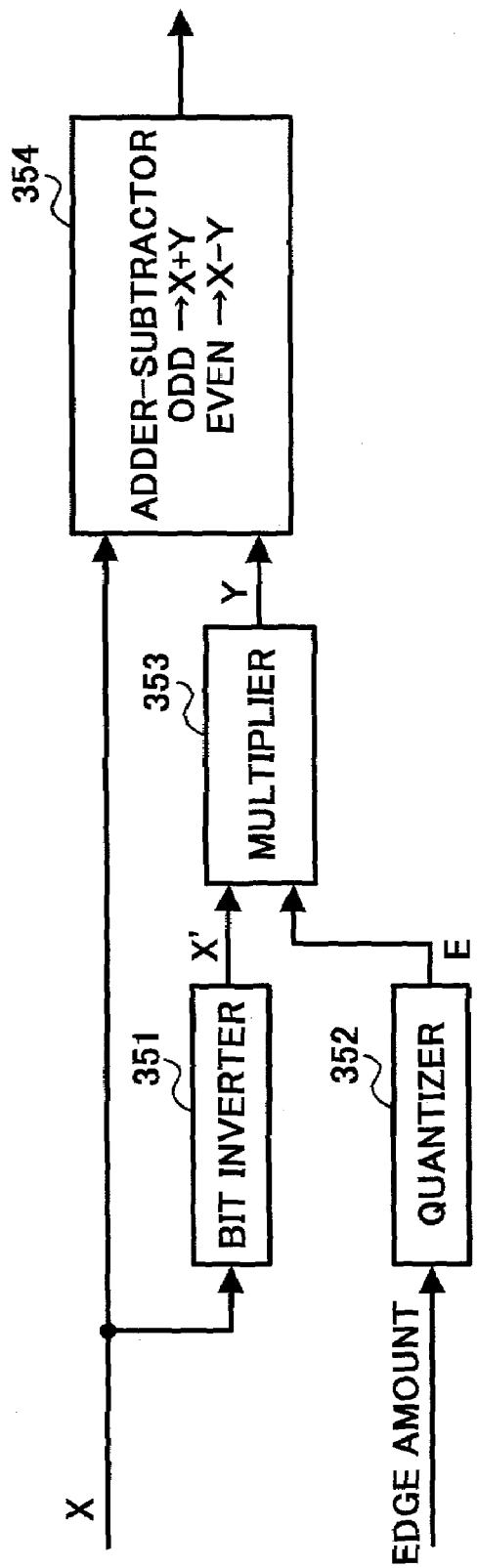
FIG. 14 shows the configuration of a halftone processor based on an edge amount.

FIG. 14 shows the configuration of the halftone processor 5 that performs halftoning based on an edge amount. In this embodiment, pseudo halftoning for a gradation image is performed by 2×1 dithering with hatching, and pseudo halftoning for a character image is performed by 1×1 dithering. In an intermediate region thereof, processing with 2×1 or 1×1 is adaptively performed according to an edge amount (it is noted that the present invention is not limited thereto).

Figure 15:
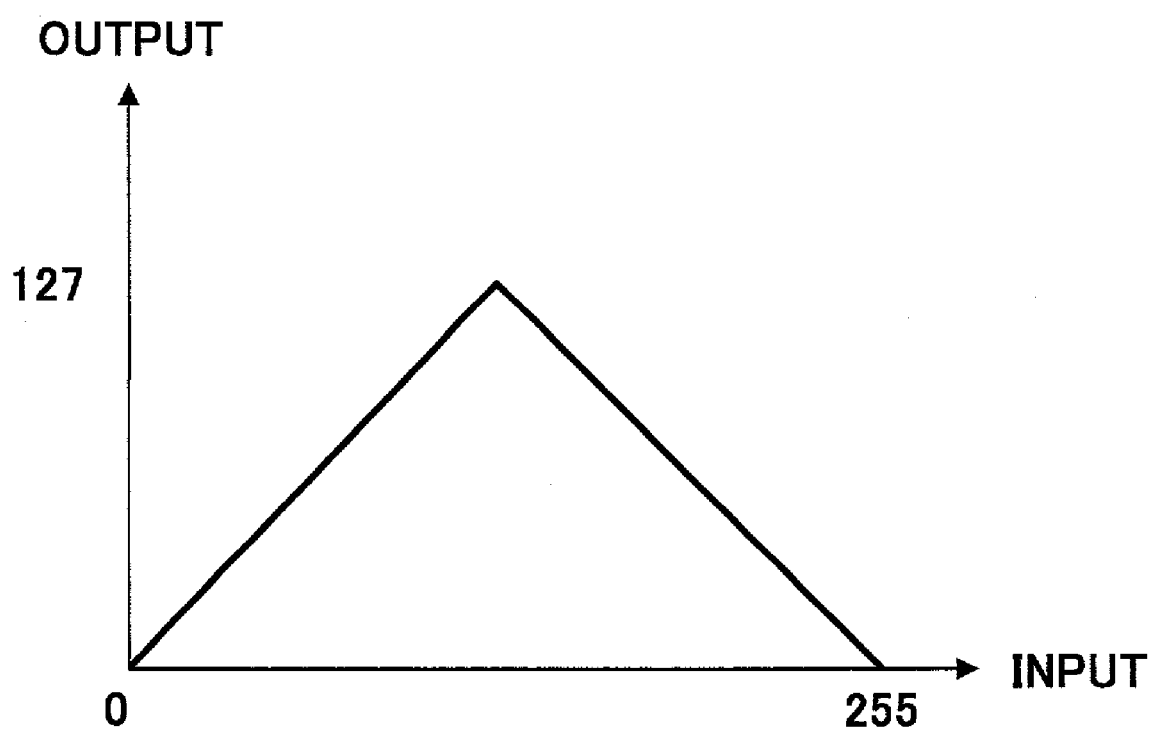
FIG. 15 shows the input-output relationship of a bit inverter.

A bit inverter 351 performs a bit inversion operation only if an input X is in a range of 128 to 255, and an input X is passed through if the input X is in a range of 0 to 127. FIG. 15 shows the relationship between the input and output of the bit inverter 351. The output X' of the bit inverter becomes a value from 0 to 127. A quantizer 352 quantizes the edge amount to any value from 0 to 63 by bit shift (E). A multiplier 353 multiplies the output X' by the quantized edge amount. The output of the multiplier 353 is Y=X'×E/63. An adder-subtractor 354 performs addition or subtraction between the source signal X and the output Y of the multiplier 353. Addition X+Y is performed for an odd line and subtraction X−Y is performed for an even line, and a result of addition or subtraction is set to an output. According to this adaptive halftoning method, 1×1 dithering for a character image is employed at the edge amount E=0, and 2×1 dithering for a gradation image is employed at the edge amount E=63.

According to this embodiment, adaptive processings in a downstream stage can be performed while taking into account the influence of the gamma processing on line width, and it is possible to exhibit the effects of a plurality of adaptive processings as desired. In addition, in detecting edge amounts, the respective processors can detect optimum edge amounts with high accuracy since it is possible to utilize optimum input signal, filter size of edge amount detection, expansion amount, and number of bits, respectively.

A third embodiment of this invention will be explained below. This embodiment shows an example of processings in which line width control is more explicit than that in the preceding embodiments, being performed before and after adaptive processings by working processing.

Figure 16:
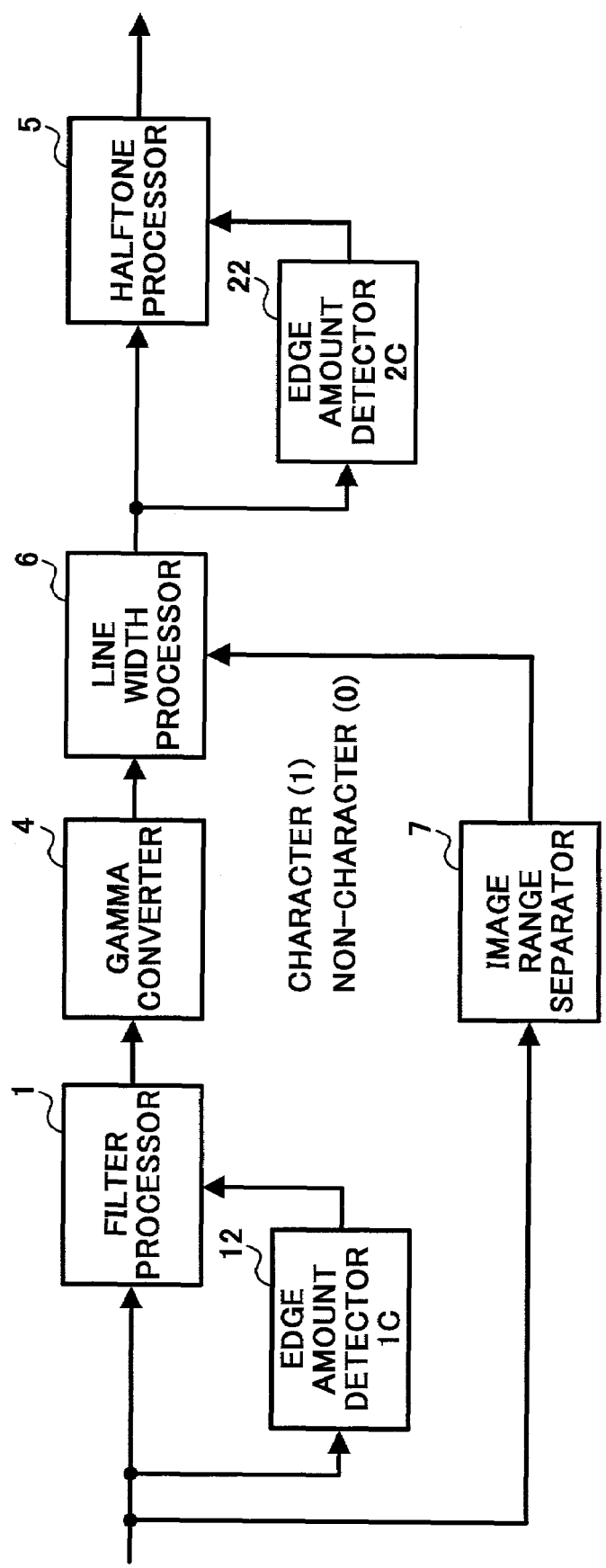
FIG. 16 shows the configuration of a third embodiment of the present invention.

FIG. 16 shows the configuration of this embodiment. A line width processor 6 is provided upstream of the halftone processor 5. The line width processor 6 receives a character detection result from an image region separator 7 to change a character so that its line is thinner or thicker (e.g., a user selects line thinning or character thickening on an operation panel).

Alternatively, to attain a higher level result, the image region separator 7 may separate a low contrast character from a high contrast character and control to make the low contrast character thicker and make the high contrast character thinner. The character thinning and the character thickening can be realized simply by contraction processing and expansion processing. The contraction processing is to set the minimum density of peripheral pixels as the density of a noted pixel. The expansion processing is to set the maximum density of peripheral pixels as the density of a noted pixel. In this embodiment, the adaptive filter processor 1 for performing the processing based on an edge amount is provided upstream of the line width processor 6, the halftone processor 5 for performing the processing based on an edge amount is provided downstream of the line width processor 6, and two edge amount detectors 12 and 22 are provided. Therefore, the edge amounts are detected using a signal before being subjected to line width processing and a signal after being subjected to the line width processing, respectively.

The edge amount detector (1C) 12 may detect an edge amount in the same manner as that in the edge amount detector 10 of the first embodiment, and the edge amount detector (2C) 22 may detect an edge amount in the same manner as that in the edge amount detector 21 of the second embodiment. In line thickening, halftone dots are expanded and the image becomes close to solid. Therefore, even if edge amount detection filters of 3×3 that are smaller in size than those shown in FIG. 10 are used, problems less occur. Considering this, it is also effective to change the size of the edge amount detection filter or an expansion rate according to the processed amount of the line width processor 6.

According to this embodiment, adaptive processings in a downstream stage can be performed while taking into account the influence of the line width processing on line width, and it is possible to exhibit the effects of a plurality of adaptive processings as desired. In addition, in detecting edge amounts, it is possible to utilize optimum input signal, filter size of edge amount detection, expansion amount, and number of bits, respectively, and therefore the respective processors can detect optimum edge amounts with high accuracy since.

A fourth embodiment of this invention will be explained below. This embodiment, unlike the preceding embodiments, shows an example in which a plurality of adaptive processings and a plurality of edge amount detectors are provided, irrespectively of line width control processing. FIG. 17 shows the configuration of this embodiment. It is assumed in this embodiment that the ink generator/undercolor remover 3 and the halftone processor 5 perform adaptive processings based on an edge amount.

As an edge amount detector (1D) 13, the edge amount detector shown in FIG. 7 is used. A signal to be used for edge amount detection filters is a black component signal (Min(C, M, Y)).

FIG. 18 shows the configuration of an edge amount detector (2D) 23. This edge amount detector (2D) 23 comprises a maximum value calculator 231, an edge amount detection filter 232, and an expansion processor 233. A signal input to the edge amount detection filter 232 is a (Max(C, M, Y)) signal from the maximum value calculator 231. This is because while the ink generation/undercolor removal may be targeted only at black character edges, the halftoning is required to be targeted at all character edges irrespective of the colors of the characters as in the first embodiment. Needless to say, any signal other than the (Max(C, M, Y)) may be used if high response to a color character edge is expected. In addition, as the edge amount detection filter 232, the circuits shown in FIG. 8 are employed similarly to the first embodiment. For the filtered signal, the spatial filters shown in FIG. 10, for example, may be used.

According to the fourth embodiment, edge amounts are calculated from color attribute signals suited for a plurality of adaptive processings, respectively. Therefore, it is possible to obtain results from the respective adaptive processings as desired.

As explained so far, according to the present invention, the following advantages can be attained.

(1) In the apparatus that includes a plurality of processors for performing adaptive processings based on edge amounts, edge amounts are individually generated according to the respective adaptive processings. Therefore, it is possible to generate an optimum edge amount for each adaptive processing and to appropriately exhibit the effect of each adaptive processing itself.

(2) A plurality of edge amount generators receives different signals. Therefore, it is possible to generate an edge amount from an optimum input signal for each adaptive processing.

(3) If a certain adaptive processing according to an edge amount is performed after the filtering, the edge amount is generated from a filtered signal. Therefore, it is possible to reflect the influence of the filtering on line width on the edge amount.

(4) If a certain adaptive processing according to an edge amount is performed after gamma conversion, the edge amount is generated from a signal after being subjected to the gamma conversion. Therefore, it is possible to reflect the influence of the gamma conversion on line width on the edge amount.

(5) In the apparatus that includes a processor for performing line width control (thinning or thickening) through image processing, if a certain adaptive processing according to an edge amount is performed after the line width control processing, the edge amount is generated from a signal after being subjected to the line width control. Therefore, it is possible to reflect the influence of the line width control through image processing on line width on the edge amount.

(6) A color attribute signal optimum for each adaptive processing is selected as a signal input to each edge amount detector. Therefore, it is possible to generate an optimum edge amount for each adaptive processing.

(7) An input bit number signal optimum for each edge amount detector is selected. Therefore, it is possible to prevent the capacity of a memory necessary for the detection of the edge amount from redundantly increasing and to generate an optimum edge amount for each adaptive processing with a minimum hardware volume.

(8) By appropriately adjusting (in size, the number of bits, expansion amount) an adjustment portion (spatial filter) for generating an optimum edge amount for each edge amount detector, it is possible to generate an optimum edge amount for each adaptive processing.

(9) By conducting adaptive processings (filtering, ink generation processing, undercolor removal processing, pseudo halftoning, and gamma conversion processing) based on edge amounts, respectively, it is possible to obtain a reproduced image in which picture pattern portions keep gradation and character edge portions are sharp and clear.

The present document incorporates by reference the entire contents of Japanese priority document, 2001-351216 filed in Japan on Nov. 16, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a plurality of adaptive processors each of which performs a different predetermined adaptive processing in accordance with an edge amount of an image signal; and
a plurality of edge amount detectors that each detect the edge amount for a corresponding one of the plurality of adaptive processors, each of the edge amount detectors configured differently so as to each detect an optimized edge amount for the corresponding adaptive processor.

2. The image processing apparatus according to claim 1, wherein each of the edge amount detectors changes an image signal that detects the edge amount in accordance with the corresponding adaptive processor.

3. The image processing apparatus according to claim 1, wherein each of the edge amount detectors changes the size of a filter that detects the edge amount in accordance with the corresponding adaptive processor.

4. The image processing apparatus according to claim 3, wherein each of the edge amount detectors obtains the edge amount by performing an expansion processing, after detecting the edge amount by use of the filter.

5. The image processing apparatus according to claim 4, wherein each of the edge amount detectors invalidates outer edge portions of the signal after being subjected to the expansion processing, after detecting the edge amount by use of the filter.

6. An image processing method comprising steps of:
performing a plurality of different predetermined adaptive processing steps in accordance with an edge amount of an image signal; and
detecting the edge amount in each of the adaptive processing steps, wherein the edge amount is optimized for the adaptive processing step in which the edge amount is detected.

7. The image processing method according to claim 6, further comprising changing an image signal that detects the edge amount in accordance with the corresponding adaptive processor.

8. The image processing method according to claim 6, further comprising changing the size of a filter that detects the edge amount in accordance with the corresponding adaptive processor.

9. The image processing method according to claim 8, further comprising obtaining the edge amount by performing an expansion processing, after detecting the edge amount by use of the filter.

10. The image processing method according to claim 9, further comprising invalidating outer edge portions of the signal after being subjected to the expansion processing, after detecting the edge amount by use of the filter.

* * * * *